United States Patent
Zhu et al.

(10) Patent No.: US 12,318,769 B2
(45) Date of Patent: Jun. 3, 2025

(54) PROMOTOR FOR ACTIVE PHASE METALS DISPERSION IN HYDROPROCESSING CATALYSTS AND METHOD OF MAKING THE CATALYST

(71) Applicant: Saudi Arabian Oil Company, Dhahran (SA)

(72) Inventors: Guanghui Zhu, Dhahran (SA); Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 61 days.

(21) Appl. No.: 17/932,937

(22) Filed: Sep. 16, 2022

(65) Prior Publication Data

US 2024/0116042 A1    Apr. 11, 2024

(51) Int. Cl.
| | | |
|---|---|---|
| *B01J 37/00* | (2006.01) | |
| *B01J 29/08* | (2006.01) | |
| *B01J 35/61* | (2024.01) | |
| *B01J 35/63* | (2024.01) | |
| *B01J 35/64* | (2024.01) | |
| *B01J 37/08* | (2006.01) | |

(52) U.S. Cl.
CPC ........... *B01J 37/0072* (2013.01); *B01J 29/08* (2013.01); *B01J 35/615* (2024.01); *B01J 35/617* (2024.01); *B01J 35/633* (2024.01); *B01J 35/635* (2024.01); *B01J 35/638* (2024.01); *B01J 35/643* (2024.01); *B01J 37/08* (2013.01)

(58) Field of Classification Search
None
See application file for complete search history.

(56) References Cited

U.S. PATENT DOCUMENTS

| | | |
|---|---|---|
| 4,141,817 A | 2/1979 | McVicker et al. |
| 4,563,440 A | 1/1986 | Forzatti et al. |
| 8,002,970 B2 | 8/2011 | Euzen et al. |
| 10,781,168 B2 | 9/2020 | Koseoglu et al. |
| 10,793,782 B2 | 10/2020 | Koseoglu et al. |
| 10,807,947 B2 | 10/2020 | Koseoglu et al. |
| 10,927,318 B2 | 2/2021 | Koseoglu et al. |
| 11,111,212 B2 * | 9/2021 | Koseoglu .............. C07C 317/04 |
| 2006/0151359 A1 * | 7/2006 | Ellis ........................ C10G 45/08 208/209 |
| 2010/0243530 A1 | 9/2010 | Marchand et al. |
| 2020/0181073 A1 * | 6/2020 | Koseoglu .............. C10G 53/12 |
| 2020/0377451 A1 | 12/2020 | Koseoglu et al. |

FOREIGN PATENT DOCUMENTS

| | | | |
|---|---|---|---|
| CN | 105498830 | * | 4/2016 |
| CN | 105688978 | A | 6/2016 |
| CN | 106046057 | A | 10/2016 |
| CN | 112473718 | A | 3/2021 |
| CN | 114471635 | * | 5/2022 |
| FR | 3075663 | A1 | 6/2019 |
| GB | 1479501 | * | 8/1974 |
| WO | 2008036743 | A2 | 3/2008 |
| WO | 2021161328 | A1 | 8/2021 |

OTHER PUBLICATIONS

Common Organic Chemicals. "Acetic Acid". 2024 (Year: 2024).*
Kohl, "Mercaptans" Science Direct. 1997. (Year: 1997).*
Le Page et al. "Chapter 5: The Preparation of Catalysts." Applied Heterogeneous Catalysis, Design, Manufacture. Use of Solid Catalyst, Technip, Paris (1987). pp. 75-123.
Perego et al. "Catalyst preparation methods." Catalysis Today 34.3-4 (1997). pp. 281-305.
International Search Report and Written Opinion in a corresponding PCT Application No. PCT/US2023/074043 mailed Nov. 24, 2023; 8 pages.

* cited by examiner

Primary Examiner — Sheng H Davis
(74) Attorney, Agent, or Firm — Leason Ellis LLP

(57) ABSTRACT

A composition comprising a promotor component is disclosed comprising a mixture of one or more catalytically active components and one or more oxidized disulfide oil (ODSO) compounds, including a water-soluble fraction of ODSO. A composition comprising an aqueous solution of one or more catalytically active components and a promotor component is also disclosed. In certain embodiments the ODSO is obtained from the effluent of an enhanced MEROX process. The compositions facilitate transfer of catalytically active components (or components that will be catalytically active in the finished solid catalyst material) onto the surface of support materials.

19 Claims, 3 Drawing Sheets

PROMOTOR FOR ACTIVE PHASE METALS DISPERSION IN HYDROPROCESSING CATALYSTS AND METHOD OF MAKING THE CATALYST

FIELD OF THE DISCLOSURE

The present disclosure relates in general to an active phase promotor composition and synthesis methods using said active phase promotor composition.

BACKGROUND OF THE DISCLOSURE

Solid catalysts are used in a multitude of applications within chemical and petrochemical processes. Catalyst selection and lifetime are often controlling factors in determining appropriate reactors and operating conditions. Important variables in the catalyst itself include the activity level, the selectivity to the desired reaction effluents, and structural stability.

Certain catalytic applications require specific active components. These active components can be added to solid support materials, for example as in elemental form, or as oxides, carbides or sulfides. Hydrotreating catalysts include one or more active components of metals or metal compounds selected from the Periodic Table of the Elements IUPAC Groups 6-10 (for example Co, Ni, Mo, and combinations thereof) on a support. Hydrocracking catalysts include one or more active components of metals or metal compounds selected from the Periodic Table of the Elements IUPAC Groups 6-10 (for example Co, Ni, W, Mo, and combinations thereof) on a support. Catalytic reforming catalysts generally contain one or more active components of metals or metal compounds selected from the Periodic Table of the Elements IUPAC Groups 8-10 (for example Pt or Pd). Hydrogenation catalysts generally contain one or more active components of metals or metal compounds selected from the Periodic Table of the Elements IUPAC Groups 7-10 (for example Pt or Pd). Oxidation catalysts generally contain one or more active components of metals or metal compounds selected from the Periodic Table of the Elements IUPAC Groups 4-10 (for example Mn, Co, Fe, Cr and Mo).

Across the many different types and purposes of catalysts, support materials can vary, and are often formed of two or more materials. Known support materials are amorphous or crystalline alumina, silica, silica alumina, titania, or zeolites. The active component(s) is/are incorporated on the surface of the particles, and/or within pores of the particles. These are also known as impregnated catalysts, where the pre-formed supports are treated after they are formed by various means to add the active metal component.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, in the presence of a catalyst. The oxidation reaction products constitute an abundant source of ODSO compounds, sulfoxides, sulfonates, sulfinates and sulfones.

The ODSO stream co-produced contains ODSO compounds as disclosed in U.S. Pat. Nos. 10,781,168 and 11,111,212 as compositions (such as a solvent (in general), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

In regard to the above background information, the present disclosure is directed to provide a technical solution for effective compositions for promoting active component dispersion during manufacture of catalyst materials.

SUMMARY OF THE DISCLOSURE

In certain embodiments, a composition comprising a promotor component is provided. The composition is used to promote active phase dispersion of catalytically active components on porous support material having outer surfaces and pore inner surfaces. The composition can include one or more oxidized disulfide oil (ODSO) compounds used to promote active phase dispersion of one or more catalytically active components on the outer surfaces and pore inner surfaces of the support material.

In certain embodiments, a composition comprising an aqueous solution of catalytically active components is provided. The catalytically active components dispersed on porous support material having outer surfaces and pore inner surfaces. The solution can comprise one or more catalytically active components and a promotor component comprising one or more oxidized disulfide oil (ODSO) compounds that is used to promote active phase dispersion of one or more catalytically active components on the outer surfaces and pore inner surfaces of the support material.

In certain embodiments, the catalytically active components are selected from Periodic Table IUPAC groups 4-14. In certain embodiments, the catalytically active components are one or more of Co, Ni, Mo, W, Pt, Pd.

In certain embodiments, the promotor component comprises ODSO compounds and water at a ratio (V %) of ODSO:H2O in the range of from 100:0. to 0.1:99.9. In certain embodiments, the promotor component comprises ODSO and one or more other promotor compounds. In certain embodiments, the other promotor compounds include one or more of citric acid, ethylenediaminotetraacetic acid (EDTA), malic acid, oxalic acid or formic acid. In certain embodiments, the one or more additional acidic promotor components has a pKa in the range of from about 1-10 or 1-6.

In certain embodiments, a method for manufacture of catalyst material is disclosed. The method comprises providing porous support material having outer surfaces and pore inner surfaces. The support material is contacted with an effective quantity of a composition to produce enhanced support material. The composition comprises a promotor component including one or more oxidized disulfide oil (ODSO) compounds. The enhanced support material is contacted with an aqueous solution of catalytically active components for promoted active phase dispersion of the catalytically active components on the outer surfaces and pore inner surfaces of the support material.

In certain embodiments, a method for manufacture of catalyst material is disclosed. The method comprises providing porous support material having outer surfaces and pore inner surfaces and contacting the support material with an effective quantity of a composition for promoted active phase dispersion of the catalytically active components on the outer surfaces and pore inner surfaces of the support material. The composition comprises an aqueous solution of catalytically active components for dispersion on porous support material having outer surfaces and pore inner surfaces. The solution comprises one or more catalytically active components and a promotor component comprising one or more oxidized disulfide oil (ODSO) compounds used to promote active phase dispersion of one or more catalytically active components on the outer surfaces and pore inner surfaces of the support material.

In certain embodiments, the support material is subjected to heating before contact with the composition. In certain embodiments, the composition is contacted with the supported solid catalyst particles and/or solid catalyst support particles in one or more steps. In certain embodiments, the supported solid catalyst particles and/or solid catalyst support particles are subjected to one or more heat treatments in between the one or more steps. In certain embodiments, the mass ratio of ODSO compounds to support material is in the range of from 0.001-1 and the mass ratio of active components to support materials is in the range of from 0.001-1. In certain embodiments, the contacting of the enhanced support material with an aqueous solution of catalytically active components is by immersion, incipient wetness, or evaporative impregnation. In certain embodiments, the support comprises a zeolite component and a binder component. In certain embodiments, the binder comprises or more amorphous inorganic oxide materials selected from the group consisting of alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia.

In certain embodiments, the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are the same or different C1-C10 alkyl or C6-C10 aryl (R'—SO—SO—OR), (R'—SOO—SO—OR), (R'—SO—SOO—OR) and (R'—SOO—SOO—OR), wherein R and R' are the same or different C1-C10 alkyl or C6-C10 aryl. In certain embodiments, the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are the same or different C1-C10 alkyl or C6-C10 aryl. In certain embodiments, the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are the same or different C1-C10 alkyl or C6-C10 aryl. In certain embodiments, the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are the same or different C1-C10 alkyl or C6-C10 aryl.

In certain embodiments, a mixture of ODSO compounds corresponds to oxidized disulfide oils present in an effluent refinery hydrocarbon stream recovered following catalytic oxidation of mercaptans present in the effluent refinery hydrocarbon stream. In certain embodiments, the one or more ODSO compounds are contained in reaction products, or a fraction of reaction products, derived from oxidation of disulfide oil compounds in the presence of an oxidation catalyst, wherein all or a portion of the oxidation catalyst is contained in the reaction products or the fraction of reaction products and is all or a portion of the one or more catalytically active components in the active component carrier composition; in certain embodiments the oxidation catalyst are metals or metal compounds containing one or more transition metals.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figures 1, 2:
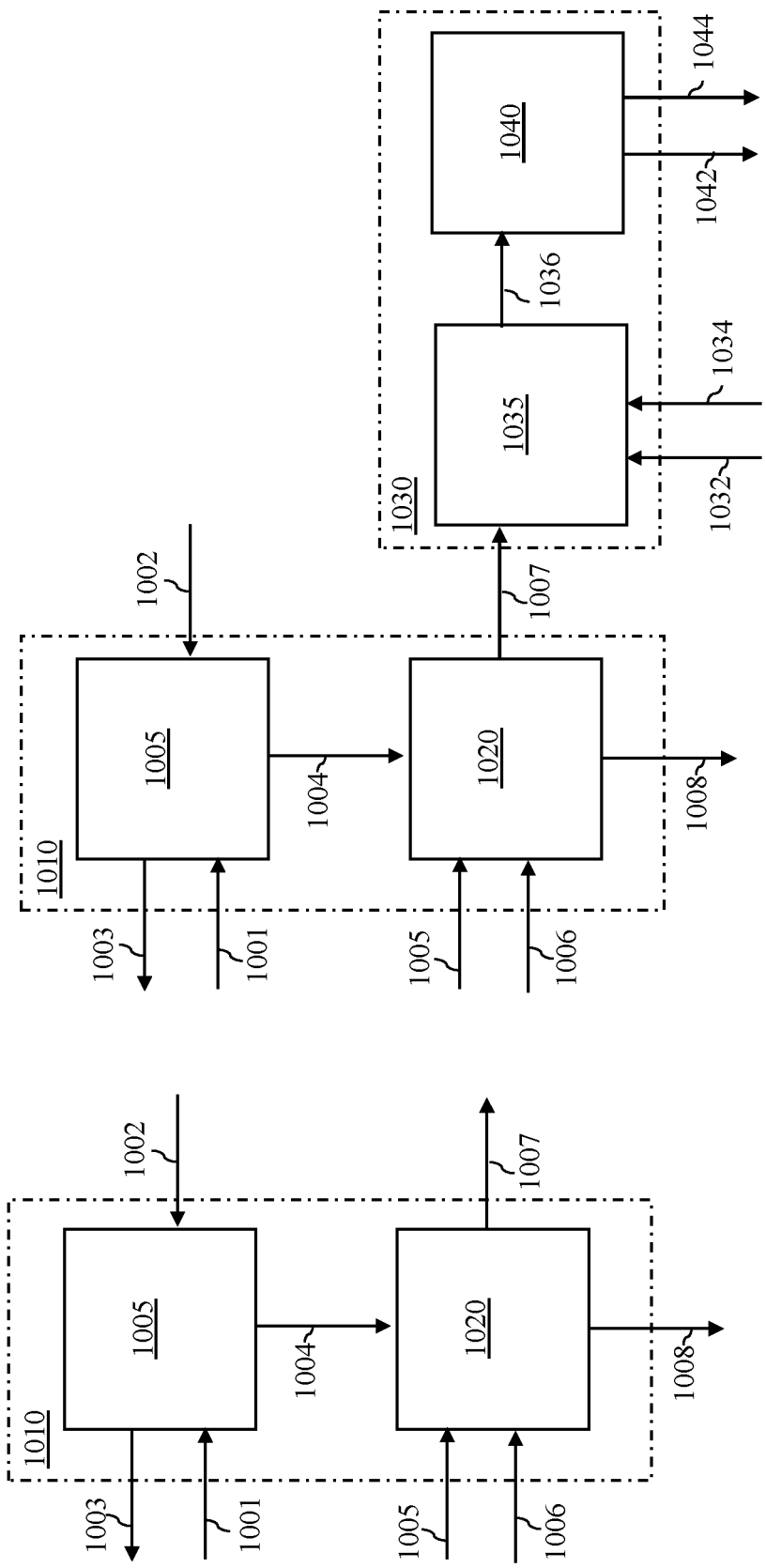
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

In some embodiments, a composition comprising a promotor component is disclosed. The composition is used to promote active phase dispersion of catalytically active components on porous support material having outer surfaces and pore inner surfaces. The composition can include one or more oxidized disulfide oil (ODSO) compounds and is used to promote active phase dispersion of one or more catalytically active components on the outer surfaces and pore inner surfaces of the support material.

In some embodiments, a composition comprising an aqueous solution of catalytically active components is disclosed. The composition is dispersed on porous support material having outer surfaces and pore inner surfaces. The solution can include one or more catalytically active components and a promotor component. The promotor component can include one or more oxidized disulfide oil (ODSO) compounds and is used to promote active phase dispersion of one or more catalytically active components on the outer surfaces and pore inner surfaces of the support material.

In certain embodiments the ODSO is obtained from the effluent of an enhanced MEROX process. The active phase promotor composition facilitates post-synthesis transfer of catalytically active components (or components that will be catalytically active in the finished solid catalyst material) onto the surface of support materials.

In certain embodiments, a method for manufacture of catalyst material is disclosed. The method comprises providing porous support material having outer surfaces and pore inner surfaces and contacting the support material with an effective quantity of a composition for promoted active phase dispersion of the catalytically active components on the outer surfaces and pore inner surfaces of the support material. The composition comprises an aqueous solution of catalytically active components for dispersion on porous support material having outer surfaces and pore inner surfaces. The solution comprises one or more catalytically active components and a promotor component comprising one or more oxidized disulfide oil (ODSO) compounds used to promote active phase dispersion of one or more catalytically active components on the outer surfaces and pore inner surfaces of the support material.

The one or more active components are added after a support material having outer surfaces and pore inner surfaces is formed and is in its solid state, using an aqueous impregnating solution containing the promotor component which has an effective amount of one or more ODSO compounds. In general, adding an active component to a support material, referred to herein as post-synthesis active component incorporation, involves contacting the solid support material (for instance in the form of powder, particulates, granules, and/or extrudates), with an impregnating solution for a suitable period of time, followed by drying. For certain applications, the solid material is activated, for example by calcination, reduction or other appropriate treatments. In the processes herein, an effective amount of one or more ODSO compounds is included in the impregnating solution used for post-synthesis active component incorporation.

Post-synthesis active component incorporation, also referred to as active component impregnation, include known techniques to load a given solid support material with an active component, generally by solid-state transfer or wet impregnation. Solid-state transfer involves physical mixing of the active component(s) and the solid support material in a solid state. Wet impregnation uses the active component(s) dissolved in a liquid solution, an impregnating solution, to transfer the active component to the solid support material.

Impregnating solutions are typically aqueous solutions containing one or more active component(s) and/or precursors of one or more active component(s). Other conventional constituents include: pH adjusters to adjust the solubility of the active components and the adsorption strength of active components on the support surface; viscosity modifiers to slow down or speed up the metal ion diffusion during evaporation to achieve desired metal distribution; chelating agents (including citric acid, formic acid and EDTA) which will react with the metal ion in the solution to reduce the interaction between the metal ion and surface; and surface modifiers (including phosphoric acid) to react with an oxide support.

The one or more ODSO compounds in the promotor component of the impregnating solution can act as a pH adjuster, a viscosity modifier, a chelating agent, a surface modifier, or a combination thereof.

Several methods can be used to add the active component(s) to the support material including but not limited to immersion, incipient wetness, and evaporative, or any other suitable method. While the description of certain techniques is provided herein, it is to be appreciated that other techniques can benefit from the improved In certain embodiments of wet impregnation, the support material is immersed in an impregnating solution having a suitable concentration of the active component tailored to achieve the targeted loading level. The solution fills the pores, which are not occluded, and is also adsorbed on the support surface, and excess solution is removed. For instance, the support material is placed on a screen and dipped into an excess quantity of the impregnating solution for a suitable time for total impregnation. The solid is then drained and dried. Such an operation can be carried out continuously with a suitable conveyor system, for instance that carries screened buckets of support material through a basin containing the impregnating solution.

In certain embodiments of wet impregnation, effective quantities of impregnating solution are applied repeatedly to the support material, in techniques known as dry impregnation or impregnation to incipient wetness. The support material is typically tumbled and/or sprayed with a volume of the impregnating solution having a suitable concentration of the active component tailored to achieve the targeted loading level, equal to or slightly less than the pore volume of the support. The support material is contacted with a solution of appropriate concentration, for example corresponding in quantity to the total known pore volume or slightly less. For example, the support material can be maintained in motion by a rotating cylinder or drum with the impregnation is sprayed on the support material.

In certain embodiments of wet impregnation, known as evaporative impregnation, support material is saturated with water or with an acidic solution, and the saturated support material is immersed into an impregnating solution having a suitable concentration of the active component tailored to achieve the targeted loading level. The active component subsequently diffuses into the pores of the support material through the aqueous phase.

In further embodiments of post-synthesis active component incorporation, wet support material is used. The wet support material contains water within all or a portion of the pore volume, for instance, in the range of about 1-100, 1-99, 1-90, 50-100, 50-99, or 50-90 V % relative to the total pore volume. This volume can be controlled by partial drying of the of the material to alter the degree of wetness. The impregnating solution, whether provided by immersion, incipient wetness, or evaporative impregnation, is completely or partially blocked from the saturated pores, and as such there is less diffusion of active components into pores. Therefore, the metals can be principally positioned at the external surface of the support material with a limited amount in the pores. This embodiment can be used as a primary step of post-synthesis active component incorporation, or as a secondary step of post-synthesis active component incorporation, for instance after a certain amount of active component (the same or different active component added to the wet support) is already within the pores of the support material, for instance, a partially loaded support material.

In certain embodiments, a method for manufacture of catalyst material is disclosed. The method comprises providing porous support material having outer surfaces and pore inner surfaces. The support material is contacted with an effective quantity of a composition to produce enhanced support material. The composition comprises a promotor component including one or more oxidized disulfide oil (ODSO) compounds. The enhanced support material is contacted with an aqueous solution of catalytically active components for promoted active phase dispersion of the catalytically active components on the outer surfaces and pore inner surfaces of the support material.

In these embodiments, the process for manufacturing the catalyst material is similar to the impregnation processes described above. However, in these embodiments, the support material is formed and is in its solid state first and then the support material is contacted with an effective quantity of the composition comprising a promotor component to produce the enhanced support material. In these embodiments, the enhanced support material can then undergo any of the above-described impregnation techniques to add the active component(s) to the enhanced support material.

In certain embodiments where the enhanced support material is produced, the contacting of the of one or more ODSO compounds with the support material can be done by one or more of immersion, incipient wetness, or evaporative impregnation. The enhanced support material can then undergo an additional immersion, incipient wetness, or evaporative impregnation process to add the active component(s).

Support material to which the active component is added according to the embodiments herein include materials that possess catalytic activity, or can be inert materials functioning as a binder and/or structural support. Regarding materials that possess catalytic activity, this activity can be due to acidity of the solid material that imparts catalytic functionality including the ability to enhance cracking reactions of hydrocarbons. Suitable solid acid catalysts are Lewis acids, Brönsted acids or a mixture thereof. Suitable materials that can encompass both catalytically active support materials and inert support materials can be amorphous and/or structured. Support materials include, but are not limited to:

Alumina (amorphous or crystalline);
silica (amorphous (including mesoporous such as SBA-15) or crystalline);
amorphous silica-alumina;
titania;
amorphous titanium dioxide
titania-silica;
zeolites (including but not limited to zeolite types): faujasite (FAU), including zeolite X, zeolite Y, HY zeolite, USY zeolite; beta zeolite (*BEA), mordenite (MOR), MFI framework zeolite, including ZSM-5; MTW framework zeolite, including ZSM-12; TON framework zeolite, including ZSM-22; MEL framework zeolite, including ZSM-11; MWW framework zeolite, including MCM-22 or MCM-56; CON framework zeolite, including SSZ-26 or SSZ-33; or another effective zeolite form; USY zeolite; ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, -IFU, IFW, IFY, IHW, IMF, IRN, IRR, -IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, -SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *—SSO, *STO, *—SVY, or *UOE, or on or more zeolites synthesized comprising co-crystallized products of two or more types of zeolites identified above, or a zeolite comprising siliceous crystalline materials with a SAR close to infinity, such as silicalites (e.g., Silicalite-1); note that the three-letter codes designated herein correspond to the framework types established by the International Zeolite Association;
silicon-substituted aluminophosphates, silicoaluminophosphate (SAPOs) (including but not limited to (AEI) including SAPO-18, (AEL) including SAPO-11, (AFI) including SAPO-5, (AFO) including SAPO-41, (AFR) including SAPO-40, (AFX) including SAPO-56, (ATN) including SAPO-39, (ATO) including SAPO-31, (CHA) including SAPO-34 and -47, (FAU) including SAPO-37, (GIS) including SAPO-43, (LEV) including SAPO-35, and (LTA) including SAPO-42);

crystalline microporous aluminophosphates (ABPOs) (including but not limited to (AEI) including AlPO-18, (AEL) including AlPO-11, (AEN) including AlPO-53, (AET) including AlPO-8, (AFI) including AlPO-5, (AFN) including AlPO-14, (AFO) including AlPO-41, (AFR) including AlPO-40, (AFT) including AlPO-52, (ANA) including AlPO-24, (AST) including AlPO-16, (ATO) including AlPO-31, (ATS) including AlPO-36, (ATT) including AlPO-33, (ATV) including AlPO-25, (AWO) including AlPO-21, (AWW) including AlPO-22, (CHA) including AlPO-34, (ERI) including AlPO-17, (LEV) including AlPO-35, (SOD) including AlPO-20, and (VFI) including AlPO-54); and metal aluminophosphates (MAPOs) (including but not limited to (AFI) including MAPO-5, (AFS) including MAPO-46, (ATN) including MAPO-39, (ATO) including MAPO-31, (ATS) including MAPO-36, and (GIS) including MAPO-43).

In certain embodiments, the support comprises support comprises a zeolite component and a binder component. The binder can comprise or more amorphous inorganic oxide materials selected from the group consisting of alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia.

The support material can be subjected to treatment whereby support properties such as pore volume, surface area, and average pore size are altered, such as by mesostructuring treatments which include one or more of desilication, steaming, acid leaching, and templated re-crystallization. Typically, these treatments are applied before active component impregnation.

In embodiments in which zeolites or other crystalline materials are used, they are conventionally formed with one or more binder components such as alumina, silica, silica-alumina, clay, titania and mixtures thereof.

In certain embodiments, the particles formed of loaded support material have a pore volume in the range of about (cc/gm) 0.15-1.70, 0.15-1.50, 0.30-1.50 or 0.30-1.70; a specific surface area in the range of about $(m^2/g)$ 100-900, 100-500, 100-450, 180-900, 180-500, 180-450, 200-900, 200-500 or 200-450; and an average pore diameter of at least about 10, 20, 30, 45, 50, 500, 1000 in certain embodiments in the range of about 10-20, 10-80, 30-80, 45-80, 50-80, 10-100, 30-100, 45-100, 50-100, 10-200, 30-200, 45-200, 50-200, 20-500, 50-500, 100-500, or 100-1000 angstrom units.

In certain embodiments, the support material that is calcined is subjected to heating before contact with the composition. In certain embodiments, the support material is heated to a temperature of up to 150° C. In certain embodiments, the support material is heated to a temperature in the range of from 100-150° C., 100-125° C., 120-150° C., 120-125° C., or 140-150° C. In certain embodiments, the composition is contacted with the supported solid catalyst particles and/or solid catalyst support particles in one or more steps. In certain embodiments, the supported solid catalyst particles and/or solid catalyst support particles are subjected to one or more heat treatments in between the one or more steps.

In the processes disclosed herein, an effective amount of the promotor component is used to facilitate incorporation of active components in catalyst materials. In certain embodiments the promotor component is employed as a component during post-synthesis active component incorporation.

In certain embodiments, a composition comprising an aqueous solution comprises a neat or diluted ODSO active phase promotor component, mixed with one or more additional metal sources. The additional metal sources can be one or more sources of Ti, V, Cr, Mn, Fe, Co, Ni, Cu, Zn, Cd or Mg. The additional metal source can be combined with the neat or diluted ODSO active phase promotor component to form a composition herein.

The active component(s) are incorporated in an effective concentration. In certain embodiments, the active component(s) are added to the ODSO or mixture including ODSO components based on their solubility. In certain embodiments, an effective concentration of active component(s) in the active phase promotor composition is in the range of about 0.01-5, 0.05-5, 0.1-5, 0.01-3, 0.05-3, 0.1-3, 0.01-2, 0.05-2 or 0.1-2 percent by mass of the active phase promotor composition.

In certain embodiments, a promotor component is provided that is undiluted from controlled catalytic oxidation of DSO, and includes about 50-100, 75-100, 90-100 percent by mass of one or more ODSO compounds, or an ODSO mixture; and wherein carrying active component(s) in the range of about 0.01-5, 0.05-5, 0.1-5, 0.01-3, 0.05-3, 0.1-3, 0.01-2, 0.05-2 or 0.1-2 percent by mass (referred to herein for convenience as a "neat" ODSO active phase promotor composition).

In certain embodiments, a promotor component comprises a neat ODSO active phase promotor composition that is diluted with water, for instance wherein the neat ODSO active phase promotor composition (which contains the active component(s)) comprises 0.1-99.9, 1-99.9, 5-99.9, 10-99.9, 25-99.9, 50-99.9, 0.1-90, 1-90, 5-90, 10-90, 25-90, 50-90, 0.1-75, 1-75, 5-75, 10-75, 25-75 or 50-75 percent by mass of the solution.

In certain embodiments, a promotor component comprises neat or diluted ODSO, mixed with one or more additional acidic promotor components, for example hydrochloric acid, sulfuric acid, nitric acid, aqua regia (a mixture of nitric acid and hydrochloric acid, optimally in a molar ratio of nitric:hydrochloric of 1:3), oxalic acid, citric acid, acetic acid, EDTA, malic acid, formic acid or combinations comprising one or more of the foregoing acids. The additional acid can be provided in pure (100 percent by mass acid) or in aqueous diluted form, for example from a solution of 0.1-99.9 percent by mass; the pure or diluted acid is combined with the diluted ODSO to form a promotor component herein. In certain embodiments, the one or more additional acidic promotor components has a pKa in the range of from about 1-10 or 1-6.

One or more catalytically active components are included in a mixture with one or more ODSO compounds for use as active component carriers. The one or more active components can vary, depending upon the application of the catalyst being manufactured. The active component can be a metal or a non-metal, in elemental form or as a compound such as oxides, carbides or sulfides. For instance, one or more active components one or more active components for hydrotreating catalysts can include one or more metals or metal compounds selected from the Periodic Table of the Elements IUPAC Groups 4-12. In certain embodiments one or more active components are selected for producing hydrotreating catalysts and can include one or more metals or metal compounds selected from the Periodic Table of the Elements IUPAC Groups 6-10 (for example Co, Ni, Mo, and combinations thereof). In certain embodiments one or more active components are selected for producing hydrocracking catalysts and can include one or more metals or metal compounds selected from the Periodic Table of the Elements IUPAC Groups 6-10 (for example Co, Ni, W, Mo, and combinations thereof). In certain embodiments one or more active components are selected for producing catalytic reforming catalysts and can include one or more metals or metal compounds selected from the Periodic Table of the Elements IUPAC Groups 8-10 (for example Pt or Pd). In certain embodiments one or more active components are selected for producing hydrogenation catalysts and can include one or more metals or metal compounds selected from the Periodic Table of the Elements IUPAC Groups 7-10 (for example Pt or Pd), and/or one or more non-metal compound such as P. In certain embodiments one or more active components are selected for producing oxidation catalysts and can include one or more metals or metal compounds selected from the Periodic Table of the Elements IUPAC Groups 4-10 (for example Ti, V, Mn, Co, Fe, Cr and Mo) or from the Periodic Table of the Elements IUPAC Groups 4-12 (for example Ti, V, Mn, Co, Fe, Cr, Cu, Zn, W, Mo).

In certain embodiments, the active component(s) in the promotor component are carried over from the preceding catalytic oxidation of MEROX process by-products DSO and accordingly the concentration depends on the amount used therein. In certain embodiments, catalytic oxidation of MEROX process by-products DSO can occur with an increased amount of oxidation catalyst compared to that which is typically used, wherein excess is passed with the ODSO fraction and used herein as the promotor component (with or without additional active component(s)).

In certain embodiments, the promotor component containing the one or more ODSO compounds and the one or more catalytically active components is derived from a sulfur-containing refinery waste stream of disulfide oil. The promotor component is derived from reaction products, or a fraction of reaction products, obtained from oxidation of disulfide oil compounds in the presence of an oxidation catalyst. All or a portion of the oxidation catalyst is contained in the reaction products or the fraction of reaction products. That retained oxidation catalyst is then reused in a beneficial manner as all or a portion of the one or more catalytically active components in the active phase promotor composition, that is transferred to the formed catalyst material. For example, as described above and in commonly owned U.S. Pat. No. 10,807,947 which is incorporated by reference herein in its entirety, a controlled catalytic oxidation of MEROX process by-products DSO can be carried out. The resulting oxidized effluents contain ODSO. As disclosed in 10,807,947, the by-product DSO compounds from the mercaptan oxidation process can be oxidized, typically in the presence of a catalyst. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. In embodiments herein, a catalyst is used in the oxidation process. The oxidation catalyst can contain one active metals from IUPAC Groups 4-12 of the Periodic Table. In certain embodiments oxidation catalyst are metals or metal compounds containing one or more transition metals. In certain embodiments oxidation catalyst are metals or metal compounds containing one or more metals selected from the group consisting of Ti, V, Mn, Co, Fe, Cr, Cu, Zn, W, Mo and combinations thereof. In certain embodiments oxidation catalyst are compounds containing one or more metals or metal compounds selected from the group consisting of Mo (VI), W (VI), V (V), Ti (IV), and combinations thereof. In certain embodiments, suitable homogeneous catalysts include molybdenum acetylacetonate, bis(acetylacetonate) dioxomolybdenum, molybdenum naphthenate, molybdenum hexacarbonyl, tungsten hexacarbonyl, sodium tungstate and vanadium pentoxide. In certain embodiments, a suitable catalyst is sodium tungstate, $Na_2WO_4 \cdot 2H_2O$.

In certain embodiments, the mass ratio of ODSO compounds to support material can be in the range of from 0.001-1, 0.01-1, 0.1-1, 0.001-0.5, 0.01-0.5, or 0.1-0.5. In certain embodiments, the mass ratio of active components to support materials can be in the range of from 0.001-1, 0.01-1, 0.1-1, 0.001-0.5, 0.01-0.5, or 0.1-0.5.

The promotor component comprises one or more ODSO compounds. The active component promotor can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

In certain embodiments, the promotor component is obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R'—SO—SO—OR), (R'—SOO—SO—OR), (R'—SO—SOO—OR) and (R'—SOO—SOO—OR). In certain embodiments, in the above formulae R and R' are the same or different C1-C10 alkyl or C6-C10 aryl. It will be understood that since the source of the DSO is a refinery feedstream, the R and R' substituents vary, e.g., methyl and ethyl subgroups, and the number of sulfur atoms, S, in the as-received feedstream to oxidation can extend to 3, for example, trisulfide compounds.

In certain embodiments the water-soluble compounds and water-insoluble compounds are separated from one another, and the promotor component comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments a promotor component comprises, consists of or consists essentially of at least one water-soluble ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments a promotor component comprises, consists of or consists essentially of a mixture or two or more water-soluble ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments a promotor component comprises, consists of or consists essentially of ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' are the same or different C1-C10 alkyl or C6-C1O aryl. In certain embodiments, the R and R' are methyl and/or ethyl groups. In certain embodiments, the ODSO compound(s) used as a promotor component have 1 to 20 carbon atoms.

In certain embodiments, a promotor component comprises, consists of or consists essentially of ODSO compounds having an average density greater than about 1.0 g/cc. In certain embodiments, a promotor component comprises, consists of or consists essentially of ODSO compounds having an average boiling point greater than about 80° C. In certain embodiments, a promotor component comprises, consists of or consists essentially of ODSO compounds having a dielectric constant that is less than or equal to 100 at 0° C.

Table 1 includes examples of polar water-soluble ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds used as active phase promotors comprise all or a portion of the water-soluble ODSO compounds contained in an oxidation effluent stream that is derived from controlled catalytic oxidation of MEROX process by-products, DSO compounds, as disclosed in U.S. Pat. Nos. 10,807,947 and 10,781,168 and as incorporated herein by reference above.

In some embodiments, the ODSO compounds used as active phase promotors are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4}O \rightarrow \tfrac{1}{2}RSSR + \tfrac{1}{2}O \qquad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R in the reaction. The reaction is then written:

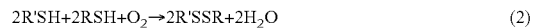

$$2R'SH + 2RSH + O_2 \rightarrow 2R'SSR + 2H_2O \qquad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C. -150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in countercurrent flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding disulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and combinations thereof. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the U.S. Pat. No. 10,781,168, which is incorporated herein by reference above.

FIG. 2 is a simplified schematic of an E-MEROX process that includes E-MEROX unit 1030. The MEROX unit 1010 unit operates similarly as in FIG. 1, with similar references numbers representing similar units/feeds. In FIG. 2, the effluent stream 1007 from the generalized MEROX unit of FIG. 1 is treated. It will be understood that the processing of the mercaptan containing hydrocarbon stream of FIG. 1 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLES

The below examples and data are exemplary. It is to be understood that other ratios and types of aluminum sources, silica sources, bases and structure directing agents can be used as compared to the examples.

Figure 3A:
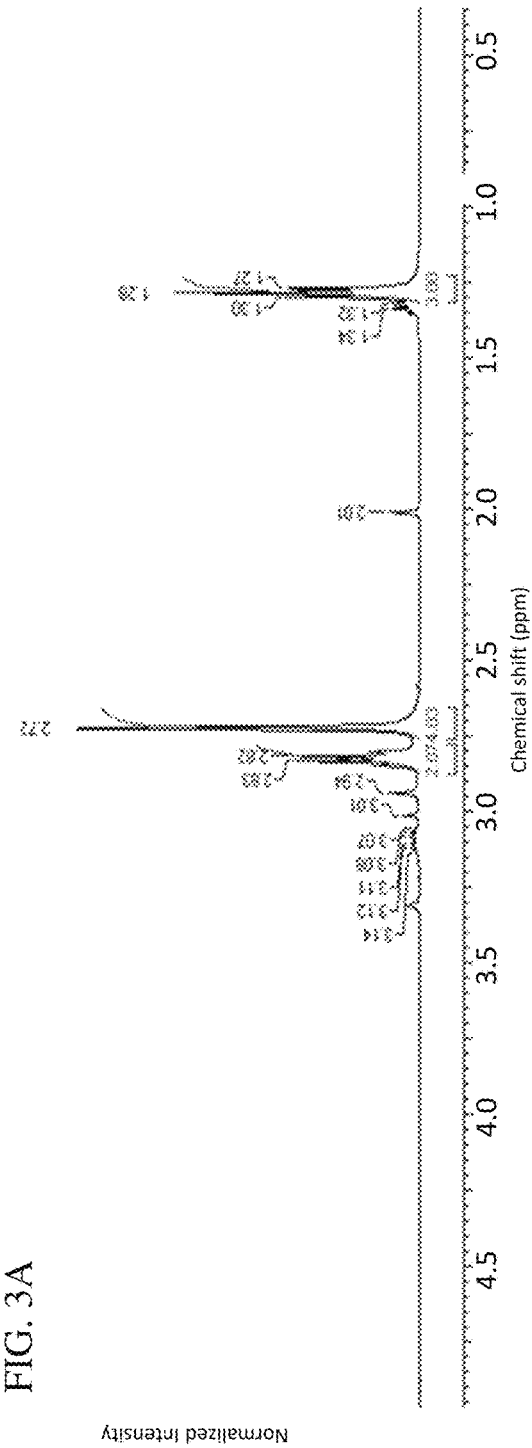
FIG. 3A is the experimental $^1$H-NMR spectrum of the polar, water-soluble ODSO fraction used as an active component carrier herein.
Figure 3B:
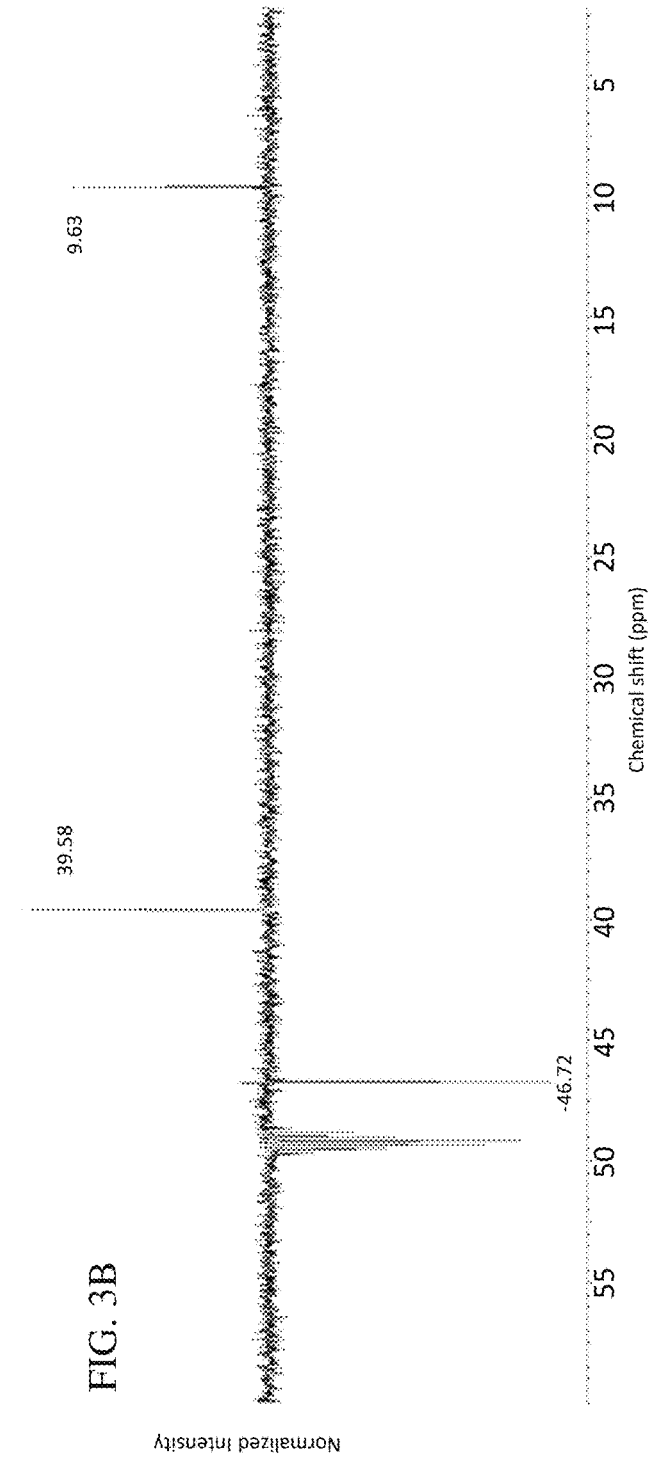
FIG. 3B is the experimental $^{13}$C-DEPT-135-NMR spectrum of the polar, water-soluble ODSO fraction used as an active component carrier herein.

Reference Example: The ODSO mixtures used in the Examples below were produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon monosulfur content) was 2.90. After the addition of the oxidant was complete, the reaction vessel temperature was set to reflux at 800 C for approximately one hour. after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, referred to herein as "the selected water soluble ODSO fraction," was used. FIG. 3A is the experimental $^1$H-NMR spectrum of the polar, water soluble ODSO mixture that is the selected water soluble ODSO fraction in the example herein. FIG. 3B is the experimental $^{13}$C-DEPT-135-NMR spectrum of the polar, water soluble ODSO mixture that is the selected water soluble ODSO fraction in the example herein. The selected water soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental $^{13}$C-DEPT-135-NMR spectrum of FIG. 3B for the selected water soluble ODSO fraction with a saved database of predicted spectra, it was found that a combination of the predicted alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIGS. 3A and 3B that the selected water soluble ODSO fraction comprises a mixture of ODSO compounds that form an ODSO acid of the present disclosure.

Comparative Example 1: In a comparative example, an amorphous silica alumina and alumina carrier catalyst was impregnated with Ni—Mo. The metal precursors used for this comparative example were nickel nitrate hydrate and ammonium molybdate tetrahydrate with targeted metal-based loading of 3.9 wt % for Ni and 13.3 wt % for Mo. A metal solution was prepared with 5.8 g nickel nitrate, 6.3 g ammonium molybdate tetrahydrate and 35 g water. The carrier with volatile free weight of 22.5 g was loaded into a rotary evaporator. Then, the metal solution was slowly added to the evaporator. After all the metal solution was added, the heating bath was raised to 95° C. and the metal solution was dried overnight. The dried catalyst was transferred to a muffle oven and calcined in air with the following temperature program 10° C./min to 120° C., hold for 3 hours; 10° C./min to 535° C., hold for 2 hours; 10° C./min to 30° C.

Example 1: An amorphous silica alumina and alumina carrier catalyst was synthesized, as described above, with the inclusion of an active phase promotor composition, ODSO as described in the Reference Example. 1.2 g of the ODSO was added into the metal solution before being introduced into the evaporator.

Figure 4:
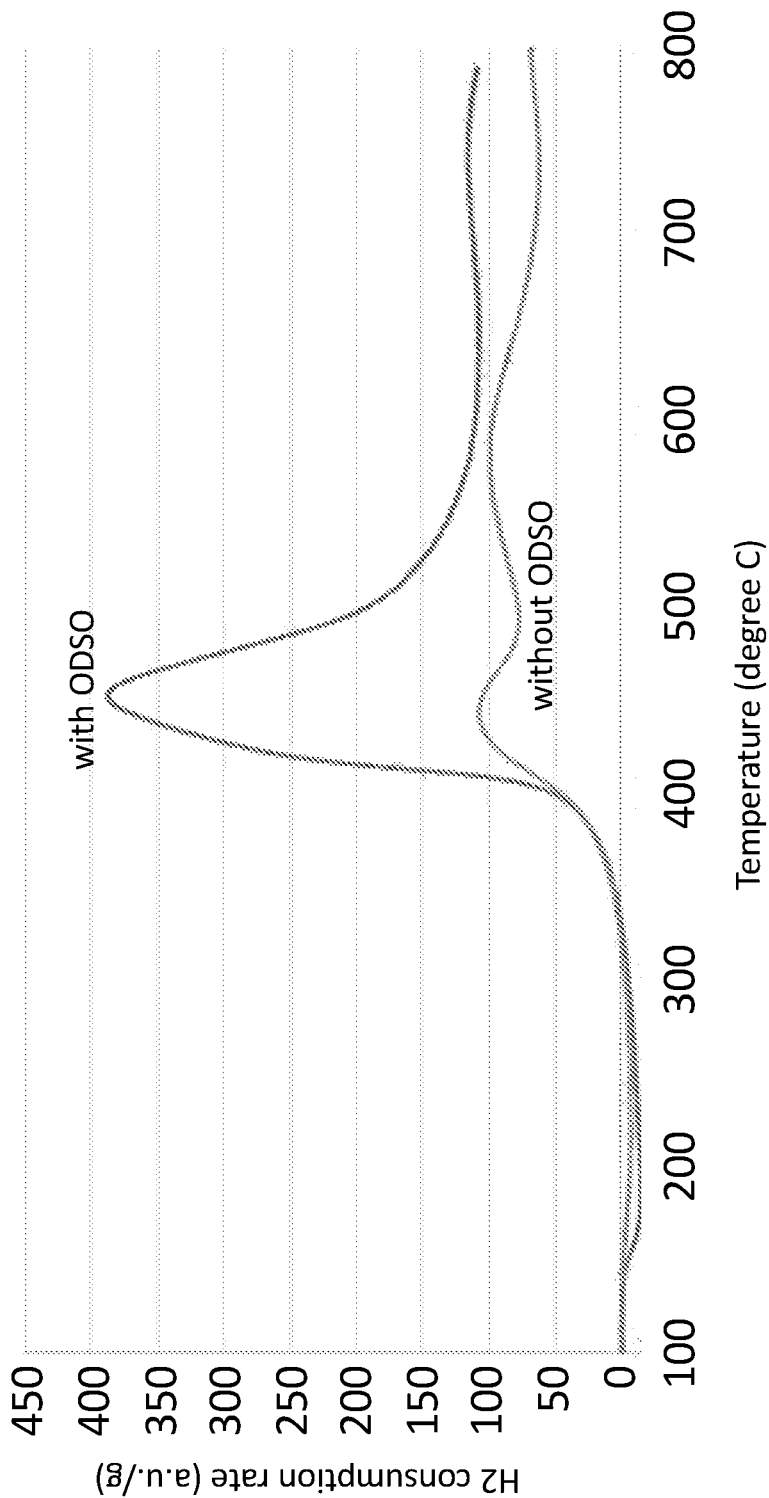
FIG. 4 shows the Temperature Programmed Reduction data for catalysts that use ODSO to promote active phase dispersion and catalyst that do not use ODSO to promote active phase dispersion.

FIG. 4 shows temperature programmed reduction data for the catalyst prepared according to Comparative Example 1 and Example 1. The data are presented as hydrogen consumption rate (in arbitrary units per gram of material) vs. temperature (in degrees Celsius). During this analysis, each of the catalysts were dried at 500° C. in Argon for 30 minutes before cooling down to room temperature. Then the gas was switched from Argon to $H_2$ and temperature was raised to 800° C. at 10° C./min. The $H_2$ consumption was monitored by a thermal conductivity detector (TCD). It is clear from FIG. 4 that the catalyst prepared with ODSO has more hydrogen update capacity.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must).

It is to be understood that like numerals in the drawings represent like elements through the several figures, and that not all components and/or steps described and illustrated with reference to the figures are required for all embodiments or arrangements.

Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
|---|---|---|
| Dialkyl-sulfonesulfoxide Or 1,2-alkyl-alkyl-disulfane 1,1,2-trioxide | (R-SOO-SO-R') | 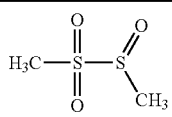 1,2-Dimethyldisulfane 1,1,2-trioxide |
| Dialkyl-disulfone Or 1,2 alkyl-alkyl-disulfane 1,1,2,2-tetraoxide | (R-SOO-SOO-R') | 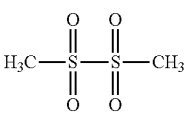 1,2-Dimethyldisulfane 1,1,2,2-tetraoxide |
| Alkyl-sulfoxidesulfonate | (R-SO-SOO-OH) | 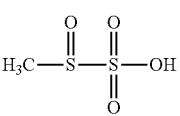 Methylsulfanesulfonic acid oxide |
| Alkyl-sulfonesulfonate | (R-SOO-SOO-OH) | 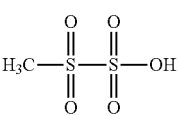 1-Hydroxy-2-methyldisulfane 1,1,2,2-tetraoxide |
| Alkyl-sulfoxidesulfinate | (R-SO-SO-OH) | 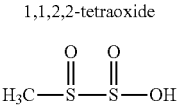 1-Hydroxy-2-methyldisulfane 1,2-dioxide |
| Alkyl-sulfonesulfinate | (R-SOO-SO-OH) | 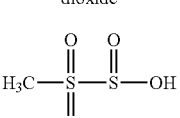 Methylsulfanesulfinic acid dioxide |

R and R' can be the same or different alkyl or aryl groups comprising 1-10 carbon atoms.

What is claimed is:
1. A method for manufacture of catalyst material comprising:
providing a support material in the form of powder, particulates, granules, extrudates or a combination of said forms, the support material being porous and including outer surfaces and pore inner surfaces for receiving catalytically active components;

contacting the support material with a promotor component composition including one or more oxidized disulfide oil (ODSO) compounds to produce enhanced support material; and contacting the enhanced support material with an aqueous solution of the catalytically active components, precursors of the catalytically active components or a combination thereof, as an impregnating solution to disperse the catalytically active components on the outer surfaces and pore inner surfaces of the support material and transfer thereto to form support material loaded with the catalytically active components.

2. The method of claim 1, wherein the catalytically active components are selected from Periodic Table IUPAC groups 4-14.

3. The method of claim 1, wherein the catalytically active components are one or more of Co, Ni, Mo, W, Pt, or Pd.

4. The method of claim 1, wherein the promotor component comprises ODSO compounds and water at a ratio (V %) of ODSO:$H_2O$ in the range of from 100:0, to 0.1:99.9.

5. The method of claim 1, wherein the promotor component comprises ODSO and one or more other promotor compounds selected from the group consisting of citric acid, ethylenediaminetetraacetic acid (EDTA), malic acid, oxalic acid and formic acid.

6. The method of claim 5, wherein the one or more additional acidic promotor components has a pKa in the range of from about 1-10.

7. The method as in claim 1, wherein the mass ratio of ODSO compounds to the support material is in the range of from 0.001-1 and the mass ratio of the active components to the support material is in the range of from 0.001-1.

8. The method as in claim 1 wherein the loaded support material has a pore volume in the range of about (cc/gm) 0.15-1.70; a specific surface area in the range of about ($m^2$/g) 100-900; and an average pore diameter of at least about 10 angstrom units.

9. The method as in claim 1, wherein said support material comprises a zeolite component and a binder component, wherein said binder component comprises or more amorphous inorganic oxide materials selected from the group consisting of alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia.

10. The method as in claim 9, wherein the zeolite is one or more of zeolites identified by the International Zeolite Association, including those with the identifiers ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, -IFU, IFW, IFY, IHW, IMF, IRN, IRR, -IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, -SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *—SSO, *STO, *—SVY, *UOE, silicalites, or one or more zeolites synthesized comprising co-crystallized products of two or more types of zeolites.

11. The method of claim 9, wherein the zeolite is USY zeolite.

12. The method as in claim 1, wherein the ODSO is derived from oxidation of disulfide oil compounds present in an effluent refinery hydrocarbon stream recovered following catalytic oxidation of mercaptans present in a mercaptan-containing hydrocarbon stream.

13. The method as in claim 1, wherein the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are the same or different C1-C10 alkyl or C6-C10 aryl.

14. The method as in claim 1, wherein the ODSO compounds have 3 or more oxygen atoms and include two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are the same or different C1-C10 alkyl or C6-C10 aryl.

15. The method as in claim 1, further comprising subjecting the enhanced support material to one or more heat treatments prior to contacting with the aqueous solution of catalytically active components.

16. A method for manufacture of catalyst material comprising:
providing a support material in the form of powder, particulates, granules, extrudates or a combination of said forms, the support material being porous and including outer surfaces and pore inner surfaces for receiving catalytically active components;
contacting the support material with an aqueous solution of the catalytically active components, precursors of the catalytically active components or a combination thereof, as an impregnating solution to disperse on porous support material having outer surfaces and pore inner surfaces, the solution comprising one or more catalytically active components and one or more oxidized disulfide oil (ODSO) compounds as a promotor component for dispersion of the catalytically active components on the outer surfaces and pore inner surfaces of the support material transfer thereto to form support material loaded with the catalytically active components.

17. The method as in claim 16, further wherein the support material is subjected to heating before contact with the composition.

18. The method as in claim 17, wherein the composition is contacted with support material in one or more steps.

19. The method of claim 18, wherein the support material is subjected to one or more heat treatments in between the one or more steps.

* * * * *